F. B. KENDALL.
Road-Leveler.
No. 213,288. Patented Mar. 18, 1879.
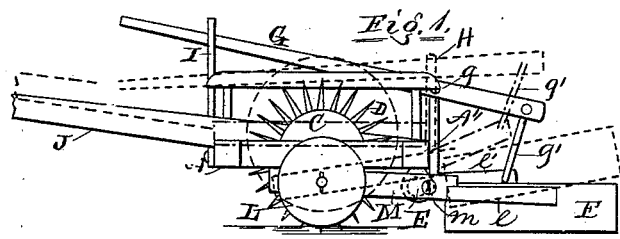
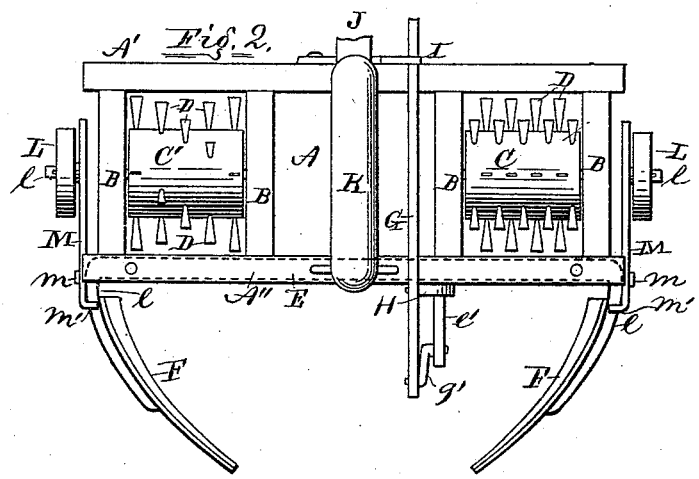
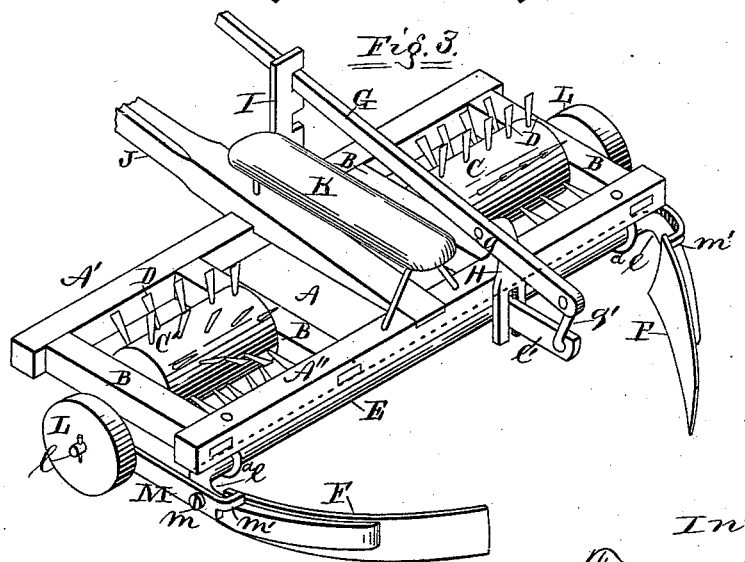
Witnesses:
M. H. Barringer.
H. A. Allen
Inventor:
Francis B. Kendall,
By W. B. Richards,
Atty.

UNITED STATES PATENT OFFICE.

FRANCIS B. KENDALL, OF MONMOUTH, ILLINOIS.

IMPROVEMENT IN ROAD-LEVELERS.

Specification forming part of Letters Patent No. 213,288, dated March 18, 1879; application filed July 5, 1878.

*To all whom it may concern:*

Be it known that I, FRANCIS B. KENDALL, of Monmouth, in the county of Warren and State of Illinois, have invented certain new and useful Improvements in Road-Levelers; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a side elevation of a machine embodying my invention. Fig. 2 is a top-plan view. Fig. 3 is a perspective view.

My invention relates to a machine for leveling and smoothing rough roads; and consists in certain improvements hereinafter more fully set forth.

Referring to the drawings by letters, A represents the main frame, formed of bars A' A'', connected by a pair of bars, B B, at each end. C C' are cylinders, of wood or other suitable material, and are journaled one between and to each pair of bars B. D represent cutters, chisel-shaped, as shown in the drawings, projecting radially from each cylinder, and may be arranged in series parallel with the axis of the cylinder, as shown at cylinder C, or in spiral series, as shown at cylinder C'. E is a shaft journaled below the bar A'' in bearings *a a*.

The ends *e e* of the shaft E are curved backward, and have each a scraper-blade, F, attached thereto, shaped as shown in the drawings, and placed obliquely to the frame A, as shown at Figs. 2 and 3.

G is a lever, pivoted at *g* to a standard, H, which is attached to the bar A''. The rear end of the lever G is connected, by a link, *g'*, with the outer end of a lever-handle, *e'*, which projects from the shaft E, and the forward end of the lever G is adjacent to a vertical rack-bar, I, which is attached to the bar A'.

J is the tongue of guide-pole, and K is the driver's seat. L L are wheels journaled on spindles *l*, which project from bars M, one at each side of the machine. Each bar M is pivoted at *m*, near its rear end, to the turned-back portion *e* of the shaft E, and has its rear end, *m'*, turned inward over said part *e*, so that the forward ends of the bars M and the wheels L may rest in contact with the ground; but as the shaft E is rotated to lift the scrapers F from the ground the frame A and the cylinders of cutters may be raised clear of the ground, the wheels L and bars M supporting them.

To bring the machine into working position, the lever G is engaged with the upper notch in the bar I, as shown by full lines in the drawings, which lowers the scrapers F, and also brings the bars *e* into such inclination in reference to the bars M as to permit the lowering of the frame and cylinders, and remove the weight thereof from the bars M and the wheels L, and allow the cutters D to come in contact with the ground.

The cutters D will penetrate the hard ground and loosen it in the higher parts, so that the scrapers F following may act more effectually upon it, and their oblique positions will, in passing the dirt laterally, force it into the ruts and other low places.

By lowering the forward end of the lever G, as shown by dotted lines at Fig. 1, the scrapers F will be raised from the ground and the bars *e* be brought to such an angle to the frame A as to hold the wheels L in a lower relative position to said frame A, and in such position as to hold the cutters D entirely above the surface of the ground for local transportation on the wheels L.

What I claim as new is—

1. In a road-leveler, the cylinders C C', journaled near the opposite ends of the frame A and armed with teeth, in combination with the scrapers F, arranged at opposite ends of the frame, and converging toward each other without meeting, substantially as described, and for the purpose set forth.

2. The lever G, link *g'*, arm *e'*, and rack-bar I, in combination with the shaft E, journaled in the frame A, and converging scrapers F, substantially as described, and for the purpose set forth.

3. The scrapers F, attached to the shaft E, journaled to the frame A, in combination with the cylinders of cutters C C', substantially as and for the purpose specified.

4. The wheels L and bars M, having inwardly-turned ends $m'$, in combination with the shaft E, having ends $e$, with the scrapers F, frame A, and cylinders C C', substantially as and for the purpose specified.

In testimony that I claim the foregoing as my own I affix my signature in presence of two witnesses.

FRANCIS B. KENDALL.

Witnesses:
 JOHN T. MORGAN,
 C. D. TOURTALLOTT.